J. T. DRUFVA.

PORTABLE ELECTRIC LIGHT.

APPLICATION FILED NOV. 8, 1920.

Reissued Aug. 9, 1921.

15,176.

Inventor:
JOHN T. DRUFVA,
By John H. Bruninga,
His Attorney.

UNITED STATES PATENT OFFICE.

JOHN T. DRUFVA, OF LONGMEADOW, MASSACHUSETTS, ASSIGNOR TO HENRY HYMAN & CO., INC., OF NEW YORK, N. Y., A CORPORATION OF NEW YORK.

PORTABLE ELECTRIC LIGHT.

15,176. Specification of Reissued Letters Patent. Reissued Aug. 9, 1921.

Original No. 1,287,919, dated December 17, 1918, Serial No. 183,653, filed July 31, 1917. Application for reissue filed November 8, 1920. Serial No. 422,736.

*To all whom it may concern:*

Be it known that I, JOHN T. DRUFVA, a citizen of the United States, and residing at Longmeadow, in the county of Hampden, in the State of Massachusetts, have invented a new and useful Improvement in Portable Electric Lights, of which the following is a specification.

This invention relates to battery hand lamps of the type designed to be operated while held in the hand, being lighted at will, by the manipulation of a thumb switch of some similar device.

Such hand lamps often include in their structure, an insulating casing having at either end metallic fittings which may be connected in the electrical circuit in such a way that the lamp may be lighted by making electrical connection between the two fittings at opposite ends of the casing. As such lamps are often carried in tool boxes and similar places, there is liability of such connection being accidentally made by contact with tools, the lamp being thereby lighted and the battery exhausted unnecessarily.

One of the objects of this invention, therefore, is to provide means for insulating one of these metallic fittings from the electrical circuit, so as to obviate the possibility of closing the electrical circuit accidentally by contact with surrounding objects.

In lamps having metallic casing parts which are included in the electric circuit, it is necessary to insulate one branch of the circuit between the switch and the battery. This may be done by insulating the reflector, in which case a suitable support must be provided to center the same in the casing.

Another object of this invention, therefore, is to provide novel means for insulating one side of the circuit, and for supporting the reflector.

Further objects will appear from the detailed description taken in connection with the accompanying drawings, in which.

Figure 1:
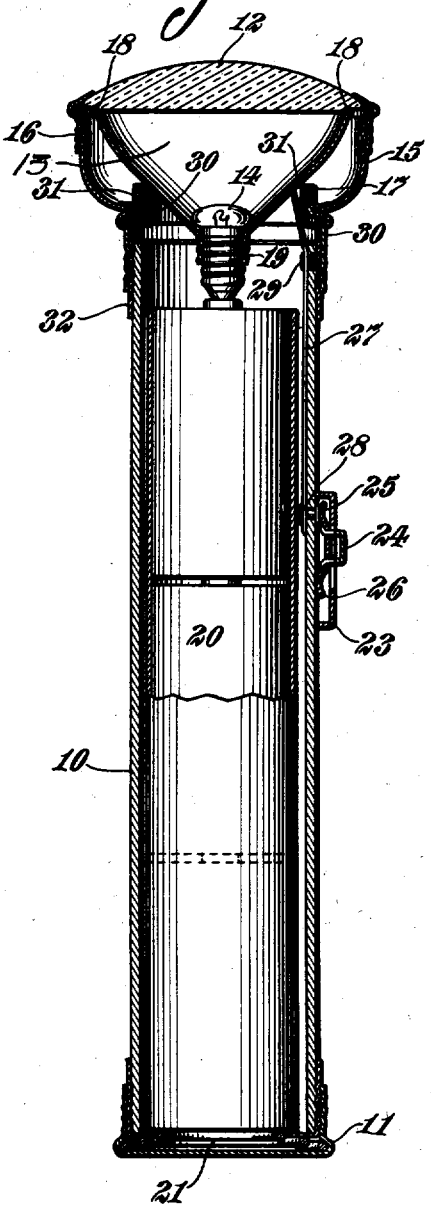
Figure 1 is a sectional view of a flash lamp embodying this invention.
Figure 2:
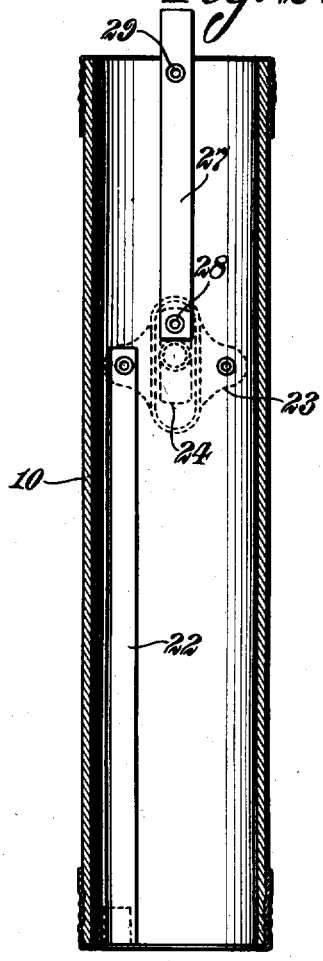
Fig. 2 is a sectional view of a fiber casing showing the arrangement of conductors leading to the thumb switch.
Figure 3:
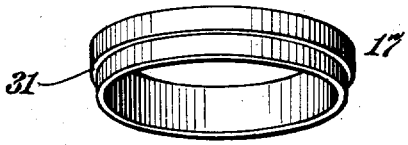
Fig. 3 is a perspective view of the insulator used to insulate the reflector from the metal end fitting.

Referring now to the accompanying drawing, the lamp comprises a casing 10 which in the case of fiber casing may be provided with metallic end fittings forming casing parts. One end of the casing is closed by a metal screw cap 11 which contains a contact spring 21 of the usual form adapted to support and contact with the battery 20. Connected with the lower screw fitting is a conductor 22 extending upwardly to the escutcheon 23 inclosing the thumb switch.

The thumb switch comprises the escutcheon 23 inclosing a sliding contact member 25 operated by the thumb piece 24 which slides in a support in the escutcheon 23. The contact piece 25 is slidable into or out of contact with the end of the rivet 28 which connects on the interior of the casing to the conductor 27 extending upwardly to a point somewhat beyond the upper end of the casing. The conductor 27 is attached to the casing at the upper end by a rivet 29, the head of which is sunk below the outside surface of the casing, so as to avoid contact with the metal screw fitting on that end of the casing.

A metal globular cap 15 may be arranged to screw on to the upper screw fitting and may be adapted for engagement with the ring 16 to retain the lens 12 in position.

The lower portion of the cap 15 is bent inwardly as shown at 30 to form an inwardly extending annular shoulder. Seated on the shoulder 30 is an insulating ring 17 having an annular shoulder 31 adapted to engage the shoulder 30.

The reflector 13 having the usual sleeve 19 adapted to receive the lamp 14 is arranged to seat at an intermediate portion thereof upon the ring 17, and to be insulated thereby from the cap 15. The outer end of the reflector 13 may be spaced from the outer end of the cap 15, so as to insulate it therefrom. An annular shoulder 18 may be formed on the lens 12 so as to maintain the reflector in position.

The conductor 27 extends upwardly from the casing 10 and passing inwardly of the ring 17 contacts with the reflector 13 to complete the lamp circuit.

It will be noted that the insulating element or ring 17 supports and centers the reflector 13 in the casing and insulates it from the cap 15. The cap 15, is, therefore, completely insulated from the lamp circuit and there is no possibility of closing the lamp circuit through said cap.

It will be seen, therefore, that this invention accomplishes its objects and produces a hand lamp which cannot be short circuited by contact with external objects. In addition to this, one side of the electric circuit is insulated from the casing by providing means for insulating and supporting the reflector, and centering it in the casing.

It is obvious that various changes may be made in the details of construction without departing from the spirit of this invention; it is, therefore, to be understood that this invention is not limited to the specific details shown and described.

Having thus described this invention, what is claimed is:

1. In a battery hand lamp having a metal casing part and a metal reflector in the lamp circuit and spaced at its outer end from said casing part, a narrow insulating ring mounted on said casing part and providing an annular seat adapted to support said reflector longitudinally and laterally at an intermediate portion thereof.

2. In a battery hand lamp having a metal casing part and a metal reflector in the lamp circuit and spaced at its outer end from said casing part, insulating means for said reflector mounted on said casing part and providing an annular seat adapted to support said reflector at an intermediate portion thereof and center the same in said casing part.

3. In a battery hand lamp having a metal casing part and a metal reflector in the lamp circuit and spaced at its outer end from said casing part, an insulating element having a shoulder engaging said casing part, said element providing an annular seat adapted to support said reflector at an intermediate portion thereof and center the same in said casing part.

4. In a battery hand lamp having a metal casing part, a lens and a metal reflector in the lamp circuit, having its outer end spaced from said casing part and bearing against the lens, an insulating element engaging said casing part, said element providing an annular seat adapted to support said reflector at an intermediate portion thereof and center the same in said casing part.

5. In a battery hand lamp having a metal casing part providing an internal shoulder and having a reflector provided with a lamp socket, and spaced from the casing part at its outer end, an insulating element adapted to rest on said shoulder and provide an annular seat adapted to support said reflector intermediate its socket and its outer end.

6. In a battery hand lamp having a metal casing part providing an internal shoulder and having a reflector provided with a lamp socket, and spaced from the casing part at its outer end, an insulating element having a shoulder adapted to rest on said first shoulder and provide an annular seat adapted to support said reflector intermediate its socket and its outer end.

7. In a flash light having a casing, rear and forward longitudinal conductors normally separated at their adjoining ends and adapted to be placed in electrical connection by a manually operative switch, and a battery within said casing in electrical connection with the rear conductor, a metal cap applied upon the outer end of said casing and affording at its inner portion an annular shoulder, a reflector within said cap in engagement with the forward conductor and having an electric lamp at its inner end in engagement with the positive pole of the battery, a lens over said reflector, means binding said lens upon said reflector and an insulating ring serving as a seat for said reflector and having above its lower end a shoulder seated upon the aforesaid annular shoulder, the upper edges of the reflector being set inwardly from the metal parts at the outer end of the lamp and said insulating ring also serving to insulate the reflector from said cap.

8. In a battery hand lamp having a metallic casing part and a metal reflector at one end thereof, an insulating element between said reflector and said casing part adapted to provide a seat for said reflector, and a conductor contacting with said reflector and sustained against lateral displacement by said element.

9. In a battery hand lamp having a metallic casing part and a metal reflector at one end thereof, an insulating ring seated on said casing part and in which said reflector is adapted to seat, and a conductor passing inside of said ring and sustained thereby against lateral displacement and contacting with said reflector.

Signed at New York, New York, this 15th day of April, 1920.

JOHN T. DRUFVA.